United States Patent [19]
Rinse et al.

[11] Patent Number: 5,437,750
[45] Date of Patent: Aug. 1, 1995

[54] METHOD FOR SECURING A THERMOPLASTIC INSERT

[75] Inventors: Offringa A. Rinse, Hoogeveen; John Teunissen, Drouwenerveen, both of Netherlands

[73] Assignee: Fokker Special Products B.V., Hoogeveen, Netherlands

[21] Appl. No.: 224,728

[22] Filed: Apr. 8, 1994

[51] Int. Cl.⁶ ............................................. B29C 65/08
[52] U.S. Cl. .............................. 156/73.1; 52/309.2; 156/293; 264/23; 264/248
[58] Field of Search ................ 156/73.1, 73.2, 92, 156/294, 580.2, 252, 293, 292; 411/501; 52/309.2, 787; 264/23, 248, 249

[56] References Cited

U.S. PATENT DOCUMENTS

| | | | |
|---|---|---|---|
| 3,099,057 | 7/1963 | Cook | 411/501 |
| 3,483,611 | 12/1969 | Balamuth et al. | 156/73.1 |
| 4,242,158 | 12/1980 | Olson | 156/92 |
| 4,305,540 | 12/1981 | Olson | 227/61 |
| 4,761,871 | 8/1988 | O'Connor et al. | 264/23 |
| 4,784,591 | 11/1988 | Ackermann | 156/580.2 |
| 4,817,264 | 4/1989 | Worthing | 411/501 |
| 4,865,792 | 9/1989 | Moyer | 156/92 |
| 5,147,482 | 9/1992 | Miyabayashi | 156/73.1 |

FOREIGN PATENT DOCUMENTS

| | | | |
|---|---|---|---|
| 1225628 | 3/1971 | United Kingdom | 285/21 |
| 2188866 | 10/1987 | United Kingdom . | |

*Primary Examiner*—Steven D. Maki
*Attorney, Agent, or Firm*—Young & Thompson

[57] ABSTRACT

Method for connection of thermoplastic inserts in structural sandwich panels. This connection is realized by ultrasonic welding. According to the invention the insert is introduced in a through opening in a sandwich panel and welded to the opposed outer skins. Welding is realized by engagement of the insert by a welding apparatus at its frontal ends.

11 Claims, 5 Drawing Sheets

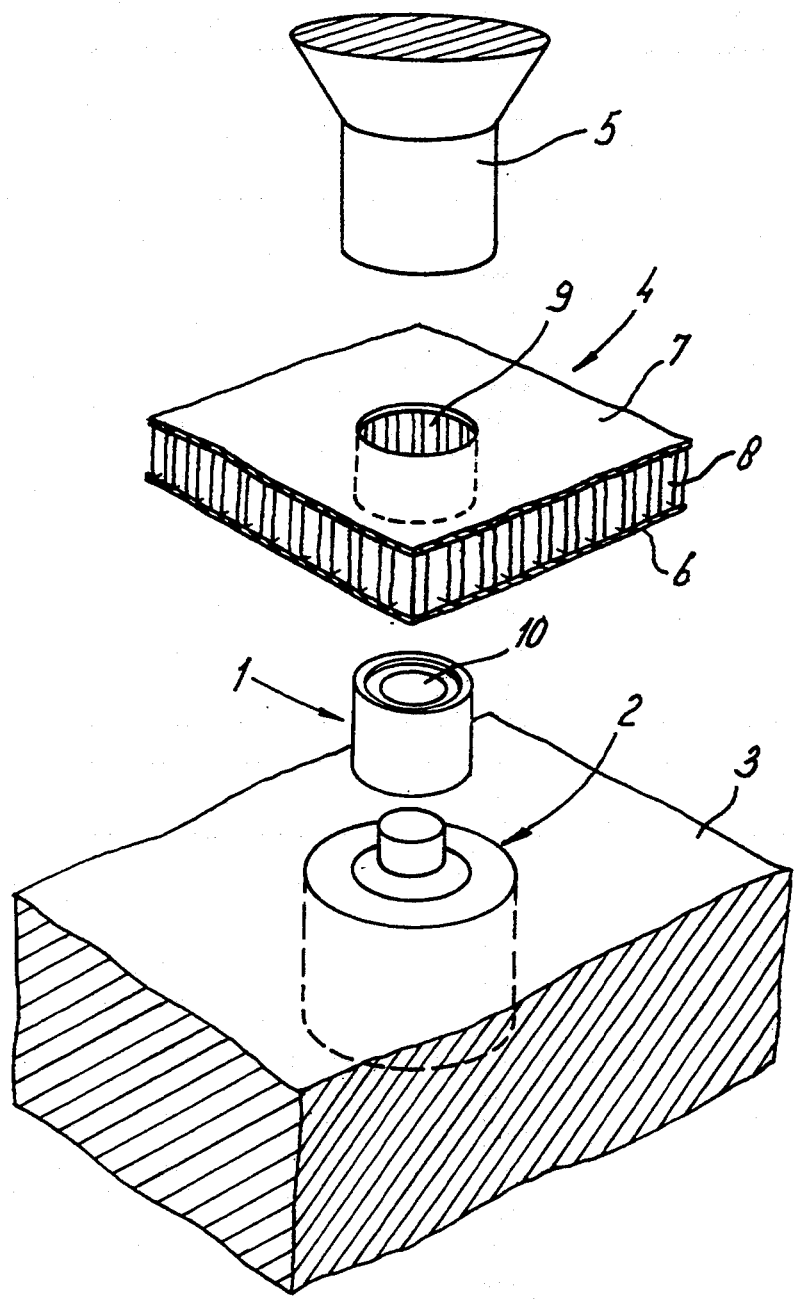

METHOD FOR SECURING A THERMOPLASTIC INSERT

FIELD OF THE INVENTION

This invention relates to the application of thermoplastic inserts in structural sandwich panels. More specifically this invention relates to a method of securing a thermoplastic insert in a structural sandwich panel which panel has two outer skins from thermoplastic material and an intermediate layer of foam or honeycomb material. This invention relates more specifically to securing a thermoplastic insert, placed in a hole in a structural sandwich panel, to the thermoplastic skins of said sandwich panel using ultrasonic welding.

This invention is especially useful in aircraft floor panels.

BACKGROUND OF THE INVENTION

Structural sandwich panels are often used in aircraft, as floor and/or bulkhead panels. Traditionally a sandwich panel consists of a pair of relatively thin skin sheets, and an intermediate layer of foam or honeycomb material. Bonded together the result is a panel with a high strength-to-weight ratio, which makes it of interest for use in aircraft. Sandwich panels are very resistant to loads that are evenly distributed over a relatively large surface area. However when sandwich panels are subjected to loads where the force is applied to a point of the panel, the intermediate layer can be crushed locally and the skins can delaminate from the core. This characteristic of sandwich panels is a problem when the panels are to be used as floor panels and therefore have to be secured to a panel support structure. The fasteners such as e.g. screws, bolts, nails, often will crush the intermediate layer locally, when passed through the panel in order to secure the panel to the support structure. Therefore it is conventional in the art of securing sandwich panels to support members, to use inserts in the panel. The inserts have a hole through which the fastener may pass in order to attach the panel to the support members e.g. rails or studs. The insert then isolates the forces exerted by the fastener which are necessary to properly attach the panels to the support member. The method of securing the insert into a hole in the sandwich panel is of direct consequence to the amount of shear and compressive forces the panel in connection to the support member is able to withstand.

The inserts used generally comprise a cylindrical body with a vertical cylindrical bore. The shape, size and form of the vertical cylindrical bore in the body is largely dependant on the fastener which is used to secure the panel to the support members. Bolts, screws, and the like exist in various forms and measurements which will require specifically shaped vertical cylindrical bores in the insert. The shape, size and form of the body part of the insert is largely dependant on the method of securing the insert into the panel. Most inserts also comprise a cylindrical head disc which is larger in diameter than the body portion.

Because of the importance of good connection and stress relief between panel, insert, fastener and support member, various methods for securing inserts in sandwich panels have been developed and are known in the prior art.

U.S. Pat. Nos. 4,242,158 and 4,305,540 to Olson, disclose a method of securing an insert in a sandwich panel using an adhesive for one part of the insert and an anvil for forming the other part of the insert. The insert used in this method comprises a cylindrical head disc as top end of a cylindrical body. The length of the body portion is greater than the thickness of the panel. The insert is introduced in a hole in the panel with the cylindrical body, the head disc of the insert rests on top of the top skin of the panel. The bottom part of the cylindrical body of the insert protrudes below the bottom skin of the panel. The head disc of the insert is secured to the top skin of this panel using a suitable adhesive. The anvil presses against the bottom part of insert and this applied pressure causes this protruding portion to flare over and form a flange which secures the insert to the bottom skin. At the same time compressed air blows excess adhesive from the contacted surface from the insert.

Sandwich panels with thermoplastic skin sheets allow the use of thermoplastic inserts. Until now the securing of thermoplastic inserts into the sandwich panel did not satisfy the structural requirements imposed by aircraft manufacturers. This is also stated by Worthing in his U.S. Pat. No. 4,817,264, column 2, line 27–45. Worthing consequently chooses to use a two part insert. This two part insert consists of a metal flange member and a thermoplastic body portion. The method described in this patent uses an adhesive to secure the head disc to the top skin of the panel and ultrasonic energy to soften the protruding end of the insert and pressure to cause this portion to flare over and form a flange. This flange forms a mechanic connection and is similar to the flange described in U.S. Pat. Nos. 4,242,258 and 4,305,540 to Olson.

The above-mentioned methods for securing inserts in sandwich panels are laborious and time consuming. Specifically, the time necessary to allow the adhesive to sufficiently harden, largely influence the production time and costs of such sandwich panels. The minimum time for hardening is generally several hours at room temperature. Also the use of adhesives requires more handling by personnel and is more fault sensitive. Also the use of adhesives adds weight to the panel and decrease the weight-to-strength ratio.

Another drawback of the prior art is the protruding head disc and bottom flange of the insert when secured into the sandwich panel.

One of the objects of this invention is to provide a method for securing a thermoplastic insert, which is placed inside a through hole in a sandwich panel, to vertical hole walls of the thermoplastic skins of said sandwich panel. The insert for use with the new securing method comprises an essentially cylindrical body with a cylindrical through bore to receive a fastener. It is another object of the invention that ultrasonic energy be applied in order to secure the insert to the thermoplastic skins of the sandwich panel. Another object of the invention is to provide the thermoplastic insert with a concentric thermoplastic rim at the top and bottom of the body, which acts as sacrificial thermoplastic matter and is fused together with the thermoplastic material on top and bottom skins of the sandwich panel as a result of the appliance of ultrasonic energy.

It is an object of this invention to provide a method for securing a thermoplastic insert to thermoplastic skins of a sandwich panel which takes not more than 10 seconds in time and results in a watertight connection. The connection between thermoplastic insert and thermoplastic skins of the panel is made by fusing thermoplastic sacrificial matter of the insert with the thermoplastic skin by applying ultrasonic energy.

SUMMARY OF THE INVENTION

The method according to the invention, of securing a thermoplastic insert in a sandwich panel, comprises the steps of providing a sandwich panel with thermoplastic top and bottom skin sheets, drilling a through hole in said sandwich panel, providing a thermoplastic insert having integrally formed sacrificial thermoplastic material, providing an ultrasonic welding apparatus, placing said insert in said through hole, applying ultrasonic energy and pressure until said sacrificial thermoplastic material of said thermoplastic insert is fused to said thermoplastic top and bottom skin sheets of said sandwich panel forming a fused bond, cooling said fused bond before further handling said sandwich panel.

The insert for use in this method is made of the same thermoplastic material as the skin sheets of the sandwich panel. Especially the top and bottom part of the inserts are to fit snugly to the through hole edges. Preferably, the insert used with this method comprises an essentially cylindrical body with an axial through bore, which bore can receive a fastener with which the panel can be fastened to support members or the like in a structure.

The sacrificial thermoplastic material of the insert is an integral part of said insert. The sacrificial material has the form of a rim on the top and bottom plane of the insert, has a same outer diameter as the outer diameter of the body of the insert, and has a volume sufficient to fill the gap between insert and skin sheet and to form the fused bond between insert and skin sheet under influence of ultrasonic energy.

BRIEF DESCRIPTION OF THE DRAWINGS

FIG. 2 is an exploded perspective view of the assembly according to the invention.

DESCRIPTION OF THE PREFERRED EMBODIMENT

Reference will now be made in detail to the present preferred embodiments of the invention.

Figure 1A:
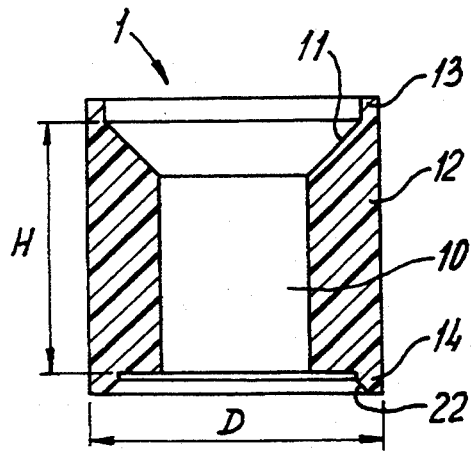
FIGS. 1a–d depicts cross-sectional views of a number of preferred embodiments of a thermoplastic insert, prior to securing.

FIGS. 1a–d depict a number of possible preferred embodiments of inserts 1 prior to assembly and securing in a hole in a sandwich panel. Insert 1 is designed specifically to enable securing with ultrasonic energy in a sandwich panel with thermoplastic skin sheets. For this reason the generic form of insert 1, according to the invention, comprises an essentially cylindrical body 12 and integrally formed axial thermoplastic sacrificial top and bottom (second and first) rims 13 and 14. The outer diameter of top and bottom sacrificial rims 13 and 14 are equal to the outer diameter of body 12 of insert 1. In the currently preferred embodiment as shown in FIG. 1a, insert 1 further comprises bore 10 with countersunk part 11. When mounting a sandwich panel which is equipped with a number of inserts according to FIG. 1a, fasteners e.g. bolts will be used, countersunk part 11 will then receive the head portion of the bolt while bore 10 will receive the shank portion. Use of inserts with a countersunk portion 11 will then after mounting of the panel on panel support members result in smooth top skin without protruding bolt heads.

Figure 1B:
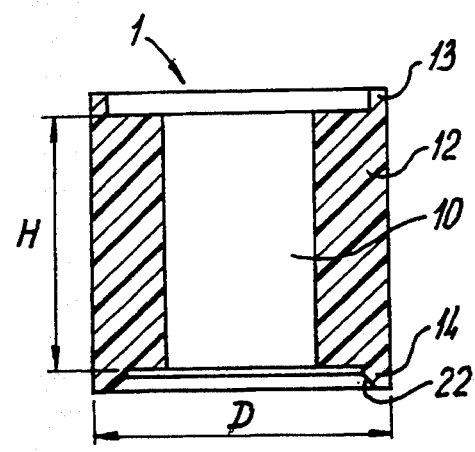
Figure 1C:
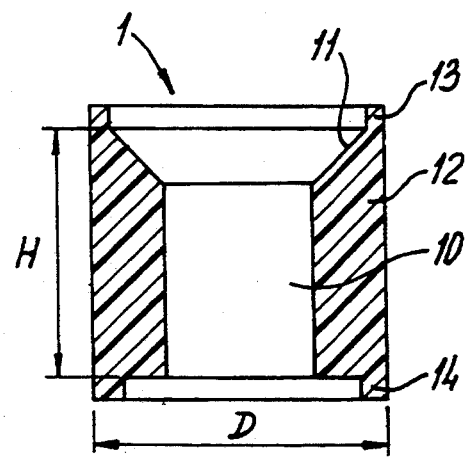
Figure 1D:
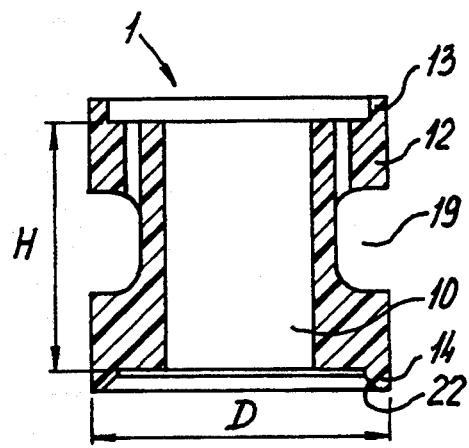

As shown in FIG. 1a the cross-sectional view of rim 13 is rectangular in shape, while rim 14 further comprises a countersunk portion 22. FIG. 1b shows an embodiment of insert 1 without countersunk part 11, while rims 13 and 14 are the same as in the embodiment shown in FIG. 1a. FIG. 1c shows rim 14 in rectangular shape. In FIG. 1d an embodiment is shown with recess 19 in body 12, this embodiment is suitable for use of a combination of two securing methods e.g. ultrasonic energy and potting resin.

The method according to the invention of securing a thermoplastic insert in a sandwich panel, by fusing thermoplastic sacrificial material of the insert to the thermoplastic material of the skin sheets vertical hole walls of through hole using ultrasonic energy will now be described in general terms.

As depicted in FIG. 2 insert 1 is placed top side down on anvil 2, consequently hole 9 in top side down placed sandwich panel 4 is aligned with insert 1 and sandwich panel 4 is lowered, with top sheet 6 faced downward, on top of insert 1. Sandwich panel 4 is supported by table 3 in which anvil 2 is situated. Then horn 5 is placed on insert 1 and ultrasonic energy and pressure (of the weight of horn 5) are applied so as to form a fused bond between the thermoplastic material of top and bottom (second and first) skin sheets 6, 7 and insert 1. Anvil 2 and welding horn 5 are part of the ultrasonic welding apparatus. Welding horn 5 can be moved relatively to table 3, while anvil 2 is fixedly attached in said table 3. In the currently preferred embodiment of the invention an ultrasonic apparatus of the 900-SERIES of manufacture BRANSON ULTRASONIC CORP, Danburry, Conn. USA is used.

Hole 9 in panel 4 is drilled in such a way as to result in a hole with vertical hole walls along the respective top and bottom skin sheets 6 and 7 without delaminations of said skin sheets. In order to attain this, it is preferred to place plates of PERSPEX-glass on top and bottom skin sheets 6, 7 of panel 4 prior to drilling and consequently drill a hole through the first layer of PERSPEX, through skin sheet 6, through core layer 8, through skin sheet 7 and through the second layer of PERSPEX. After the drilling operation the PERSPEX plates are removed. Along this way through hole 9 is formed.

Figure 3:
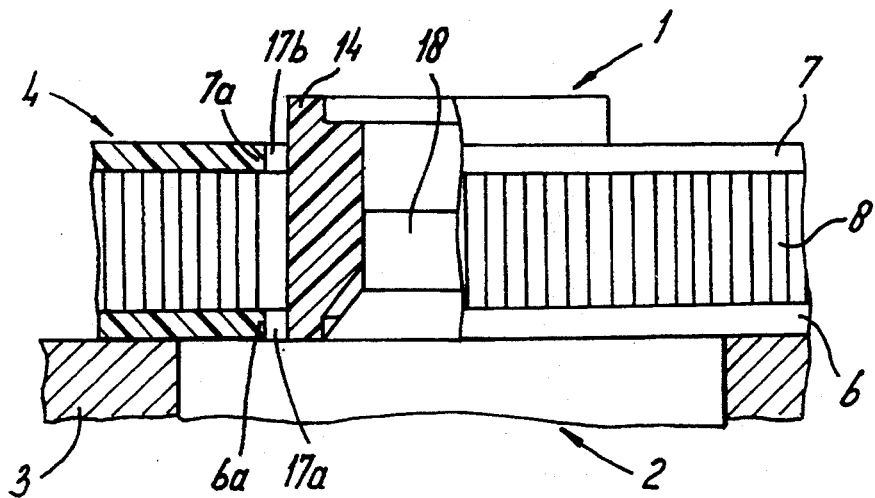
FIG. 3 is a cross-sectional enlarged view of the insert in combination with sandwich panel, prior to securing.

FIG. 3 shows a cross-sectional view of insert 1 as shown in FIG. 1a, assembled in hole 9 prior to fusing. The figure shows in exaggerated size gap 17a between insert 1 and adjacent top skin hole wall 6a, gap 17b between insert 1 and adjacent bottom skin hole wall 7a and integral sacrificial thermoplastic rims 13 and 14 of insert 1. Rims 13 and 14 must be dimensioned as to provide sufficient sacrificial thermoplastic material to fill gaps 17a and 17b and thus provide the necessary volume for the fused bond between thermoplastic skin sheets and insert. In order to attain a properly fused bond, a glove-like fit for insert 1 in hole 9 is necessary.

In the currently preferred embodiment of insert 1 rim 13 has a height of 0.25 mm and a width of 0.5 mm, and rim 14 has a height of 0.40 mm and a width of 0.50 mm.

The height of skin hole wall 6a in the preferred embodiment is 0.75 mm and the height of bottom skin hole wall 7a is 0.5 mm. The glove-like fit of insert 1 in hole 9 is attained in the currently preferred embodiment by drilling hole 9 with a drill having a diameter of 0.2 mm larger than the diameter of the insert.

Figure 4A:
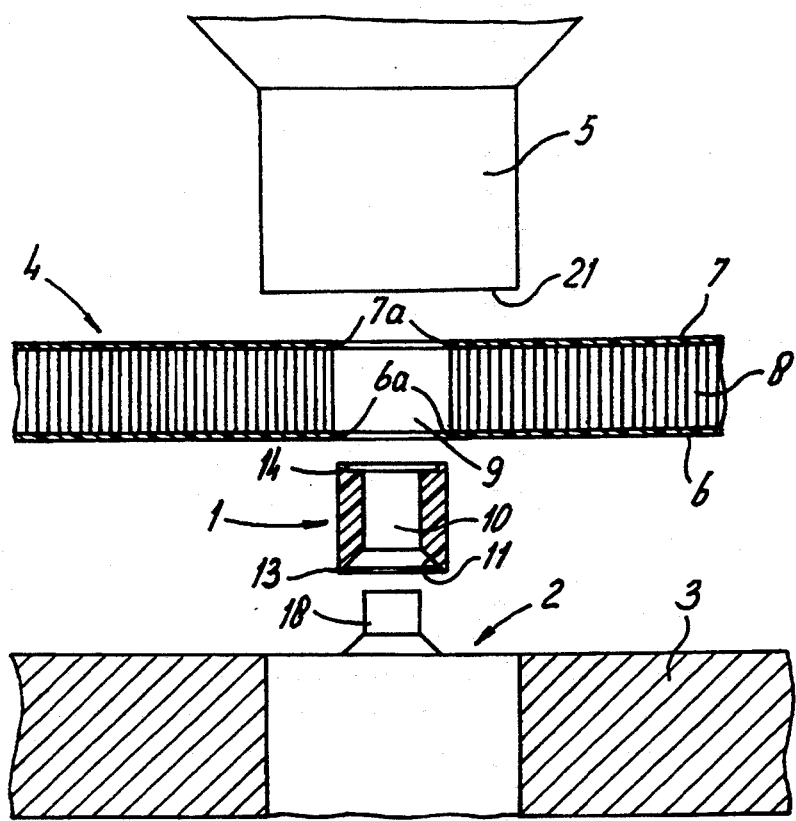
FIGS. 4a–c are cross-sectional views depicting the sequential steps of securing the thermoplastic insert to the top and bottom thermoplastic skin sheets of the sandwich panel.
Figure 4B:
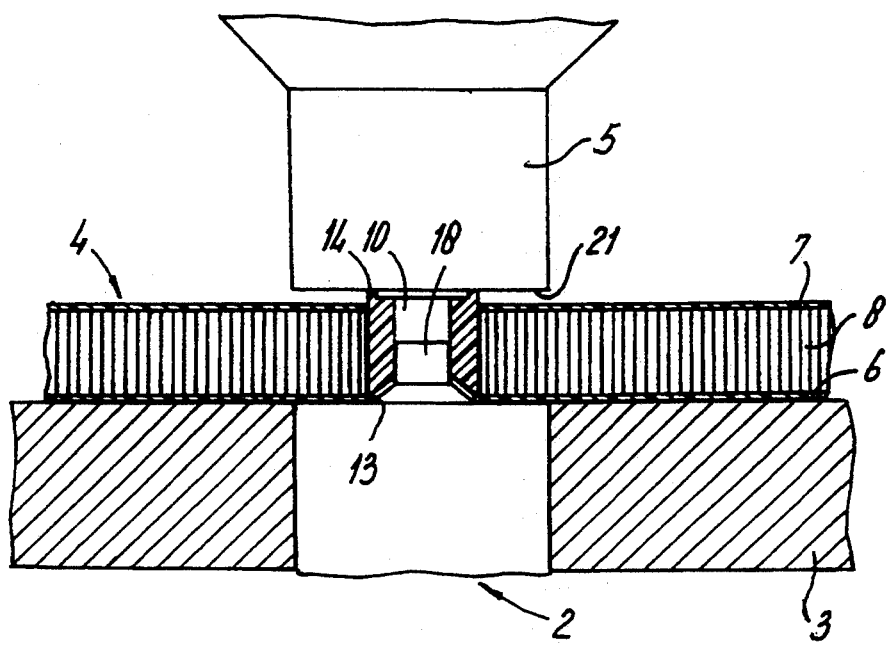
Figure 4C:
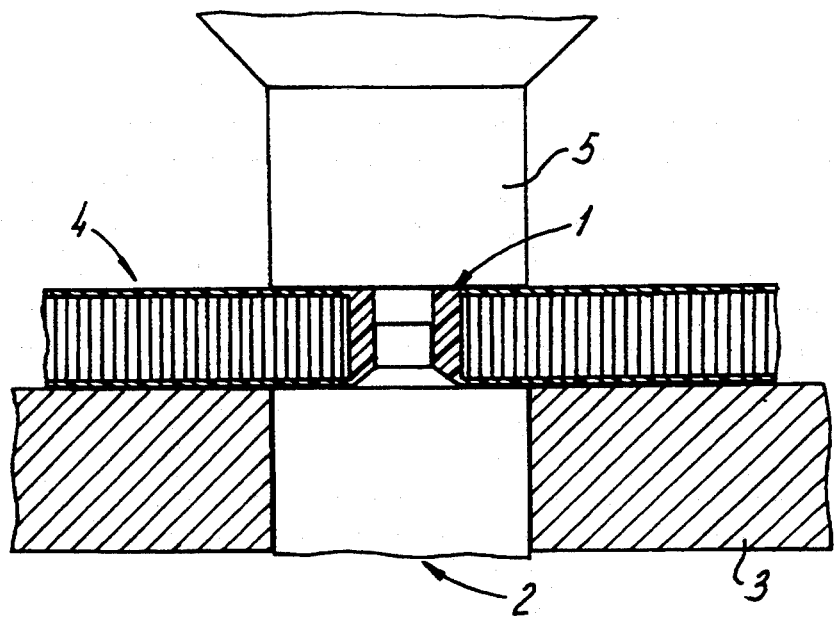

FIGS. 4a–4c show the steps of the method of securing the thermoplastic insert according to the preferred embodiment of the invention. FIG. 4a depicts a cross sectional view of insert 1 being assembled in accordance with the present invention. Insert 1 is turned top down, and the bore 10 with countersunk portion 11 and sacrificial rim 13 facing anvil 2 of the ultrasonic welding apparatus is aligned with head portion 18 of anvil 2. Sandwich panel 4 is also turned top down, with top skin sheet 6 facing table 3 and through hole 9 aligned with insert 1 and head portion 18 of anvil 2. Horn 5 of the ultrasonic welding apparatus is aligned with hole 9, insert 1 and anvil 2. Insert 1 is placed over head portion 18 of anvil 2, then panel 4 is placed over insert 1 as shown in FIGS. 4b and 3. Since rim 13 rests on lower part of head portion 18 of anvil 2, a part of insert 1 protrudes over skin sheet 7. The height of the protruding part is equal to the combined heights of rim 13 and rim 14. As shown in FIG. 4b, horn 5 is lowered and rests with flat, solid base 21 on top of rim 14 of insert 1. Once ultrasonic energy is applied, the energy will cause both rims 13 and 14 to soften, flow into respectively gap 17a and 17b and fuse with them also under influence of the ultrasonic energy and friction between insert and hole wall thermoplastic material of respectively top skin sheet 6 and bottom skin sheet 7.

Experiments with different forms and measures of the currently preferred embodiment of insert 1 as shown in FIG. 1a have taught a minor influence of shape and form of head portion 18 of anvil 2 on the necessary measurements of rim 13. The thermoplastic sacrificial material of rim 13 is efficiently guided into gap 17a under the influence of the specific form of head portion 18 of anvil 2. This results in a smaller necessary measurement of rim 13 in the preferred embodiment than rim 14. In effect the head portion of the ultrasonic welding apparatus can be tailor made to the shape, form and dimension of the bore and possible countersunk portion in any thermoplastic insert that is to be secured by use of ultrasonic energy to skin sheets of a sandwich panel.

In the currently preferred embodiment, insert 1 as shown in FIG. 1a comprises countersunk portion 11 in through bore 10, and anvil 2 is shaped to fit. This specifically shaped form of anvil 2 has a guiding effect on the sacrificial thermoplastic material of top rim 13 during the appliance of the ultrasonic energy. Flat, solid base 21 of horn 5 has no such guiding effect, resulting in the necessity to provide more sacrificial material in the bottom rim 14, in order to fill gap 17b and form a fused bond. It stands to reason that if the base 21 of horn 5 could also be tailor made to the shape, form and dimension of the bore of insert 1, without adversely effecting the ultrasonic wave pattern, undoubtedly the bottom rim 14 could have a smaller volume.

FIG. 4c depicts insert 1 of the preferred embodiment as shown in FIG. 1a secured in panel 4, prior to removing the ultrasonic work station formed by table 3, anvil 2 and horn 5.

Figure 5:
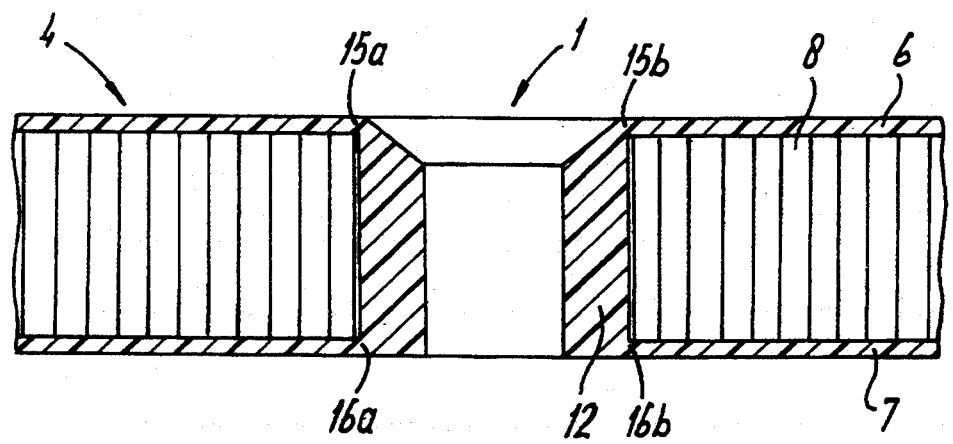
FIG. 5 is a cross-sectional view of a sandwich panel and thermoplastic insert secured therein in accordance with this invention.

FIG. 5 shows a cross sectional view of sandwich panel 4, with insert 1 secured therein. Areas 15a and 15b depict the circumferential fused bond insert and top skin sheet 6 of the panel 4. In areas 16a and 16b the fused bond is depicted between insert and bottom skin sheet 7 of the panel 4. As the thermoplastic material of the insert 1 is the same as the thermoplastic material of the skin sheets 6, 7 of the panel 4, the bond between insert 1 and skin sheets 6, 7 consists of fused thermoplastic material and no clear bond line is visible. This is shown in by indicating the thermoplastic material with continuous shading in top skin sheet 6, body 12 of insert 1 and bottom skin sheet 7, without bond lines between skin sheets 6, 7 and insert 1. It is desirable to use the same thermoplastic material for insert and skin sheets in order to get a proper fused bond. The use of fibre reinforcements is optional. For example, in the currently preferred embodiment polyetherimide (PEI)-inserts were bonded to PEI-fibre reinforced skin sheets. Also PEI-fibre reinforced inserts were bonded to PEI-fibre reinforced skin sheets. The insert can be made of PEI with 30% glass. Fused bonds between polyether-etherketone (PEEK) inserts and PEEK skin sheets, fibre reinforced PEEK skin sheets and non-fibre reinforced PEEK inserts are also possible.

It will be apparent to those skilled in the art that various modifications and variations could be made to the described invention of securing thermoplastic inserts to the thermoplastic skin sheets of a sandwich panel using ultrasonic energy, without departing from the scope or spirit of the invention.

We claim:

1. A method for securing a thermoplastic insert to skin hole walls of first and second skin sheets of a sandwich panel, comprising the steps of:

providing a sandwich panel comprising first and second fiber reinforced thermoplastic skin sheets and an intermediate core layer wherein the sandwich panel has a through hole such that the first skin sheet has a first skin hole wall which is perpendicular to the surface of the first sheet and the second skin sheet has a second hole wall which is perpendicular to the surface of the second skin sheet;

providing a thermoplastic insert having a first integrally formed sacrificial rim of thermoplastic material at one end and a second integrally formed sacrificial rim of thermoplastic material at another end;

placing said insert in said through hole in said sandwich panel such that said first rim protrudes beyond the upper surface of said first skin sheet of said sandwich panel, a first gap is formed between said insert and said first skin hole wall and a second gap is formed between said insert and said second hole wall, said first and second sacrificial rims being dimensioned so as to provide sufficient thermoplastic material to fill said first and second gaps respectively;

providing an ultrasonic welding apparatus comprising a horn and an anvil and positioning the insert between the horn and anvil; and applying ultrasonic energy to the insert with said ultrasonic welding apparatus so that said first and second sacrificial rims of said insert fuse to said first and second skin hole walls respectively, the first gap between said insert and said first skin hole wall and the second gap between said insert and said second hole wall are filled with thermoplastic material of said first and second rims respectively and the upper surface of the first skin sheet is flush with said one end of the insert.

2. A method as recited in claim 1, wherein said second rim is a cylindrical top rim having an outer diameter equal to the outer diameter of said insert.

3. A method as recited in claim 1, wherein said first rim is a cylindrical bottom rim having an outer diameter equal to the outer diameter of said insert.

4. A method as recited in claim 1, wherein said thermoplastic insert further comprises a through bore for receiving fastener means.

5. A method as recited in claim 4, wherein said anvil of said ultrasonic welding apparatus comprises a protruding head portion and said head portion is fit snugly into said through bore of said thermoplastic insert.

6. A method as recited in claim 1, wherein a table is provided for supporting said sandwich panel during the the step of applying ultrasonic energy.

7. A method as recited in claim 1, wherein the second skin sheet is a top sheet and said insert is placed on said anvil and subsequently said sandwich panel with its top sheet facing down is placed on said anvil in such a manner as to insert said insert in said through hole of said sandwich panel.

8. A method as recited in claim 1, wherein said insert and said said sheets of the sandwich panel are made of the same thermoplastic material.

9. A method as recited in claim 1, wherein said insert comprises a fiber reinforced thermoplastic plastic.

10. A method as recited in claim 9, wherein said thermoplastic insert is made of polyetherimide with 30% glass.

11. A method as recited in claim 9, wherein said thermoplastic skin sheets comprise polyetherimide fiber reinforced material.

* * * * *

UNITED STATES PATENT AND TRADEMARK OFFICE
CERTIFICATE OF CORRECTION

PATENT NO. : 5,437,750

DATED : August 1, 1995

INVENTOR(S) : Arnt Rinse OFFRINGA et al.

It is certified that error appears in the above—identified patent and that said Letters Patent is hereby corrected as shown below:

On the title page, in Item 19, change the name from "Rinse et al." to --Offringa et al.--.

On the title page, in Item 75, change the first inventor's name from Offringa A. Rinse" to --Arnt Rinse Offringa--.

Signed and Sealed this

Twelfth Day of September, 1995

Attest:

BRUCE LEHMAN

Attesting Officer

Commissioner of Patents and Trademarks